Aug. 23, 1960 C. H. HOEPPNER 2,950,471
FM TO BINARY CODE TELEMETERING RECEIVER
Filed Nov. 24, 1954
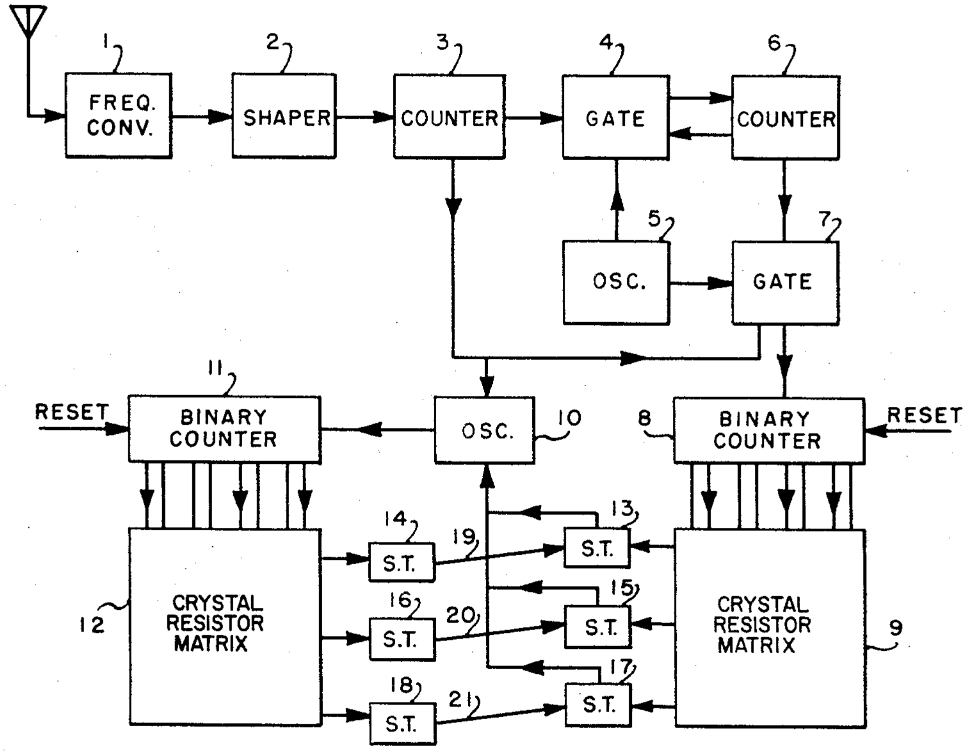
Inventor
Conrad H. Hoeppner
By W.R. Maltby
Attorneys United States Patent Office 2,950,471
Patented Aug. 23, 1960

2,950,471

FM TO BINARY CODE TELEMETERING RECEIVER

Conrad H. Hoeppner, Plandome Manor, N.Y., assignor, by mesne assignments, to the United States of America as represented by the Secretary of the Navy Filed Nov. 24, 1954, Ser. No. 471,128

6 Claims. (Cl. 340—347)

The present invention relates generally to data transmission systems and, more particularly, to a receiving arrangement for telemetering circuits for producing directly from frequency modulated subcarrier signals binary codes representative of the magnitude of the intelligence being transmitted.

In the communication system of the present invention, the information obtained from the various end measuring instruments located at the remote station is transmitted to the receiver in the form of a frequency modulated carrier wave. More specifically, the carrier wave is frequency modulated by a subcarrier which, in turn, has its frequency modulated in accordance with the amplitude of the data at the transmitter. Instead of analyzing the complete period of every subcarrier cycle, the receiver is arranged to sample, for example, every fifteenth cycle of the subcarrier and determine its precise frequency deviation. To realize a high order of accuracy in the measurement of this variable and to permit direct conversion of the subcarrier frequency into binary code form, only a fraction of the subcarrier cycle selected is utilized in the data reduction operation. The portion of the cycle selected for measurement commences a fixed time after the start of this fifteenth cycle and terminates precisely with the end of this cycle. Since the time of occurence of the end of the cycle with respect to this fixed time is dependent upon the period, the measurement made is directly proportional to the magnitude of the intelligence being transmitted.

In carrying out the above technique, the receiver of the present invention employs as a measuring standard a local oscillator which commences to step a binary counter a predetermined time after the start of the selected subcarrier cycle. This oscillator is disconnected from the counter at the end of the same subcarrier cycle within which it was first rendered effective so that the final count registered is representative of the period of the particular cycle being investigated.

Since only a fraction of the cycle is measured due to the insertion of the time delay, the oscillator can operate at a relatively high frequency to give sufficient accuracy and still the number of stages in the counter can be kept within the limits set by the number of units in the binary code being generated. If the above time delay approximates the period of the maximum subcarrier modulating frequency, the maximum time interval measured approaches the difference in periods of the maximum and minimum subcarrier frequencies. If, for example, with such a time delay, it is desired to generate a $n$ unit binary code, the precision oscillator's frequency is choosen such that it can register a full count in a $n$ stage counter within the above interval.

Also included in the receiver is a calibrating feature whereby the binary code registered in the pulse counter is modified in accordance with a predetermined plan. Such a calibration, for example, may be desired where it is necessary to compensate for the nonlinearity of the various end measuring instruments employed at the transmitter. In accordance with this aspect of the receiver, the binary code registered in the digital counter is manifested by the operation of a single selector tube in a diode tube matrix. Thereafter, a second binary counter is stepped by means of a second precision oscillator, the count recorded therein also being shown by the operation of a particular selector tube of a second diode matrix. The desired calibration is effected by establishing predetermined electrical connections between various selector tubes of these matrices. After the first counter has registered a final count, the second oscillator steps its counter until the particular selector tube of the second matrix that is interconnected to the previously operated selector tube of the first matrix is activated. When this occurs, the second oscillator is stopped, the count registered in the second counter at this time corresponding to the calibrated binary code.

Heretofore, in data reduction systems for telemetering circuits, considerable difficulties have been encountered in realizing reliable performance because of the drift in circuits employing direct current stages. It is therefore an object of the present invention to provide a method of forming binary codes directly from telemetering subcarrier waves which will not require direct current stages.

A secondary object of the present invention is to provide a receiving arrangement for frequency modulated telemetering systems which will convert directly from variable subcarrier frequency to binary code.

A further object of the present invention is to provide an improved receiving arrangement for use in data transmission systems wherein the intelligence represented by a frequency modulated carrier is readily translated to a binary code of a given number of code elements.

A still further object of the present invention is to provide a receiving arrangement for a frequency modulated telemetering system wherein the intelligence is converted to a binary code form which is corrected in accordance with a given calibration.

A still further object of the present invention is to provide a calibrating technique for use in systems wherein the intelligence is represented by binary codes.

Other objects and many of the attendant advantages of this invention will be readily appreciated as the same becomes better understood by reference to the following description when considered in connection with the accompanying drawing, the single figure of which is a block diagram of a preferred embodiment of the present invention.

Referring now to the figure, the incoming frequency modulated carrier originating at the remote station, not shown, is applied first to a frequency converting circuit 1 wherein the subcarrier is separated from the carrier by conventional heterodyne action. The subcarrier is then coupled to a square pulse forming circuit 2 which alters the sinusoidal wave form and makes it readily countable by pulse counter 3. This counter, which functions in the system to select which subcarrier cycles are to be analyzed, is arranged to produce a single output pulse in response to the registration therein of a given number of subcarrier cycles. This output pulse opens gate circuit 4 and permits, in the above example, pulses from oscillator 5 to enter pulse counter 6 at the start of every fifteenth cycle. This second counter inserts the fixed time delay between the commencement of the selected cycle and the start of the measuring interval mentioned hereinbefore. After counter 6 registers a definite number of pulses, depending upon the length of time delay desired, it generates an output pulse which opens gate 7 and closes gate 4. When this occurs, oscillator 5 no longer supplies pulses to counter 6 but instead feeds counter 8 via gate 7. The count in this circuit is advanced until gate 7 is closed by a control pulse produced at counter 3 in response to the registration therein of the next subcarrier cycle. It will thus be seen that gate 7 is open for a variable time interval which is proportional to the period of the fifteenth cycle and that this gate allows oscillator 5 to register a count in circuit 8 which is indicative of the magnitude of the intelligence being transmitted.

It will be understood, of course, that the above portion of the receiver can be modified without altering its essential mode of operation by substituting, for example, an artificial delay line or any other type of pulse delay means for counter 6. Also, counters 6 and 8 may be replaced with a single counter or the latter counter made an extension of the former. Reduction in the frequency of oscillator 5 and the counting speed of counter 8 is possible by the simple expedient of making the time delay between the commencement of a selected subcarrier cycle and the start of the actual counting operation approximately equal to a multiple of the period of the maximum subcarrier frequency. By introducing greater time delays and continuing to terminate the counting operation at the end of the same cycle within which it is commenced, the time available for registering the full count may be doubled or tripled. Thus, without sacrificing accuracy, lower frequencies can be employed to operate the counter at reduced speeds.

To calibrate the binary code registered in counter 8 in the case of an $n$ unit code, a diode matrix 9 having $2n$ vertical lines and $2^n$ horizontal lines is employed. The vertical lines of this matrix are connected via isolating amplifying stages to the plates of the flip-flop circuits forming the binary stages of the counter and the horizontal lines are connected to individual selector tubes. As is well known, one and only one of these selector tubes will be operated for each different binary code registered in the counting circuit. The details of the above circuits can be found in the article, "A Multichannel PAM-FM Radio Telemetering System," by J. P. Chisholm et al., appearing in the January 1951 "Proceedings of the I.R.E."

The same pulse from counter 3, which closes gate 7 and terminates the measuring period is also employed to control the operation of a second precision oscillator 10 which feeds a second $n$ stage binary counter 11. Associated with the output circuits of this counter is a matrix 12 which is similar in all respects to matrix 9 coupled to circuit 8. The calibrating procedure involves primarily the establishment of predetermined connections between the different selector tubes of the two matrices. For example, selector tube 13 of matrix 9, which operates at a count of, say 30, in stage 8 may be interconnected via line 19 to selector tube 14 in matrix 12 which is activated when the count in stage 11 reaches 32. Similarly, selector tubes 15 and 17 may be connected to selector tubes 16 and 18 via lines 20 and 21 and so forth. Flexibility of performance can be realized by employing patching cords as the connectors between the different selector tubes.

In one preferred circuit arrangement, selector tubes 13, 15 and 17 of matrix 9 are of the multigrid type with their screen grids adapted to be selectively driven to a positive potential level with respect to their cathodes in response to the count stored in circuit 8. Selector tubes 14, 16 and 18 of matrix 12 may be normally conducting triodes, which are selectively driven to cut off in response to different counts in stage 11, with their outputs coupled via lines 19, 20 and 21 to the control grids of the various selector tubes of matrix 9. Thus, the latter tubes perform as gating circuits, being conditioned for operation by counter 8 and being triggered by counter 11. The output pulses from these gating tubes are fed to oscillator 10 to terminate the operation of this oscillator and the advancement of counter 11. It will thus be seen that for every final count recorded in binary counter 8, there will be the same or a different count registered in counter 11 depending upon the calibration connections made between the selector tubes of matrices 9 and 12.

Obviously many modifications and variations of the present invention are possible in the light of the above teachings. It is therefore to be understood that within the scope of the appended claims the invention may be practiced otherwise than as specifically described.

I claim:

1. In a receiving arrangement for converting a selected cycle of a frequency modulated carrier wave into a binary code of $n$ units indicative of the period of said cycle the combination of a first counting circuit, means for coupling said carrier wave to said circuit to produce an output pulse at the start of said selected cycle, a first gate circuit, an oscillator, means for coupling said output pulse to said gate circuit for opening said gate, a pulse counter coupled to the output of said gate circuit, said oscillator being arranged to advance the count in said pulse counter while said gate circuit is open, a second gate circuit, means responsive to the registration of a predetermined count in said second counter for closing said first gate and opening said second gate, an $n$ stage binary counter connected to said second gate and adapted to be stepped by said oscillator when said second gate is open, and means for closing said second gate when said first counting circuit is advanced by the carrier cycle immediately following the selected cycle.

2. In a receiving arrangement for converting a selected cycle of a frequency modulated carrier into a binary code of $n$ units indicative of the period of said cycle, the combination of a first counting circuit, means for coupling said carrier to said circuit to thereby produce an output pulse at the start of said selected cycle, a gate circuit, means for coupling said output pulse to said gate circuit for opening said gate, an oscillator, a second pulse counting circuit, said oscillator being adapted to advance the count in said second counting circuit while said gate circuit is open, a second gate, means for closing said first gate and opening said second gate when said second counter registers a predetermined count, an $n$ stage binary counter connected to said second gate, said binary counter being stepped by said oscillator while said second gate is open, means for closing said second gate at the termination of said selected cycle whereby the count recorded in said binary counter is representative of the period of said selected carrier cycle.

3. In an arrangement for producing a binary code of $n$ units indicative of the period of a selected cycle of a frequency modulated carrier wave, the combination of a first pulse counter adapted to be stepped at the start of each cycle of said carrier wave, a first gate having input and output circuits, a source of timing pulses coupled to one of said input circuits, a second pulse counter coupled to said output circuit, means for coupling said first counter to another input circuit of said gate whereby said gate is opened in response to the registration of a predetermined number of cycles of said carrier wave in said first counter and whereby timing pulses from said source are fed via said first gate into said second counter, a second gate having input and output circuits, said source of timing pulses being coupled to one of the input circuits of said second gate, an $n$ stage binary counter connected to the output circuit of said second gate, means connecting said second counter to another input circuit of said second gate whereby said second gate is opened in response to the registration of a predetermined number of timing pulses therein whereby timing pulses from said source are fed via said second gate into said $n$ stage binary counter, and means for connecting said second counter to said first gate whereby said first gate is closed when said second gate is opened, and means responsive to the next change of count in said first counter for closing said second gate whereby the binary code stored in said $n$ stage binary counter is representative of the period of said selected cycle of said carrier wave.

4. In a receiver for producing a binary code of $n$ units indicative of the period of a selected cycle of a continuously transmitted frequency modulated carrier wave, the combination of an oscillator, a binary counter having $n$ stages, a gating circuit having its input coupled to said oscillator and its output coupled to said counter, means for opening said gate for a time interval starting a predetermined time after the commencement of a selected cycle and terminating at the end of this same cycle whereby the count registered in said counter is a measure of the intelligence being transmitted, a second binary counter having the same number of stages as said first binary counter, and means responsive to the registration of a final count in said first counter for advancing the count in said second counter until a predetermined calibration relationship exists between the count in said second counter and said final count.

5. In combination, a first $n$ stage binary counter, a first diode matrix coupled to said counter and having $2^n$ selector tubes, each of said selector tubes being conditioned for operation in response to the registration of different pulse counts in said counter, a second $n$ stage binary counter, a second diode matrix coupled to said second counter and having $2^n$ selector tubes, each of said last-mentioned tubes being arranged to generate a trigger pulse in response to different counts registered in said second counter, means for coupling said trigger pulses to the selector tubes of said first matrix in accordance with a predetermined calibration arrangement, means for registering a final count in said first counter to thereby condition for operation a particular selector tube in said first matrix, and means for advancing the count in said second counter until said particular tube is operated by a trigger pulse from one of said second selector tubes whereby the count then registered in said second counter is corrected in accordance with said calibration arrangement.

6. In combination, a first pulse counter, a source of pulses coupled thereto for producing an output pulse from said counter after a first predetermined number of pulses are registered therein, a first gate coupled to said counter and adapted to be opened by said output pulse, an oscillator, said oscillator being coupled to said first gate and having a frequency higher than the pulse repetition rate of said source of pulses, a second pulse counter connected to said first gate whereby pulses from said oscillator are passed to said second counter while said gate is opened, a second gate connected to said second counter, said second counter closing said first gate and opening said second gate when the count therein reaches a second predetermined number, means for coupling said oscillator to said second gate, a binary counter connected to the output of said second gate whereby said oscillator advances the count in said binary counter while said second gate is open and means responsive to the next advancement of the count in said first counter for closing said second gate whereby the count registered in said binary counter is indicative of the length of said pulses.

References Cited in the file of this patent

UNITED STATES PATENTS

| | | |
|---|---|---|
| 2,407,320 | Miller | Sept. 10, 1946 |
| 2,422,698 | Miller | June 24, 1947 |
| 2,490,500 | Young | Dec. 6, 1949 |
| 2,685,054 | Brenner et al. | July 27, 1954 |
| 2,690,507 | Woods-Hill et al. | Sept. 28, 1954 |
| 2,749,440 | Cartwright | June 5, 1956 |
| 2,752,593 | Downs | June 26, 1956 |